(12) United States Patent
Lee et al.

(10) Patent No.: US 7,240,272 B2
(45) Date of Patent: Jul. 3, 2007

(54) METHOD AND SYSTEM FOR CORRECTING ERRORS IN A MEMORY DEVICE

(75) Inventors: David Mark Lee, Southampton (GB); Robert Bruce Nicholson, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 10/839,691

(22) Filed: May 5, 2004

(65) Prior Publication Data

US 2005/0015649 A1 Jan. 20, 2005

(30) Foreign Application Priority Data

Jun. 27, 2003 (GB) .................................. 0315063.8

(51) Int. Cl.
*G11C 29/00* (2006.01)
(52) U.S. Cl. ..................................................... 714/766
(58) Field of Classification Search ................. 714/766
See application file for complete search history.

(56) References Cited

U.S. PATENT DOCUMENTS

| 5,856,989 A | 1/1999 | Oldfield et al. |
| 6,360,347 B1 | 3/2002 | Walters, Jr. |
| 6,421,805 B1 * | 7/2002 | McAuliffe ................... 714/756 |

OTHER PUBLICATIONS

Related U.S. Application entitled "System and Method for Detecting Write Errors in a Storage Device".

* cited by examiner

*Primary Examiner*—Shelly Chase
(74) *Attorney, Agent, or Firm*—Dillon & Yudell LLP (57) ABSTRACT

A method of storing data in a memory device is disclosed. The method comprises dividing data to be stored in a memory device into one or more data segments; storing the one or more data segments in the memory device; for a particular data segment among the one or more data segments, creating an error detection code; storing the error detection code in the memory device; for the particular data segment, determining an error correction segment that is a logical combination of the particular data segment with a second data segment, wherein the error correction can be used to reconstruct the particular data segment; and storing the error correction segment in the memory device.

21 Claims, 4 Drawing Sheets

METHOD AND SYSTEM FOR CORRECTING ERRORS IN A MEMORY DEVICE

This present application claims priority to the subject matter of GB Patent Application No. 0315063.8, Filed Jun. 27, 2003; entitled "Memory Devices". The content of the above-referenced application is incorporated herein. This application is also related to U.S. application Ser. No. 10/839,106, entitled "System and Method for Detecting Write Errors in a Storage Device" filed concurrently herewith.

BACKGROUND OF THE INVENTION

1. Technical Field

The present invention relates to memory devices for use in electronic, such as microprocessor-based, systems, and more particularly to so-called "flash memory" devices for use in such systems.

2. Description of the Related Art

As is known in the art, many microprocessor-based devices and systems use so-called "flash memory" devices (i.e. a particular form of EEPROM (Electronically Erasable Programmable Read-Only Memory) to store data, software, etc. Such devices can include, for example, mobile telephones, electronic toys, cameras, and domestic appliances such as washing machines, etc. Indeed, almost every microprocessor-based product will typically use a flash memory.

However, a disadvantage to the use of flash memory is that a single bit error in the memory can often prevent a product or device from functioning. Indeed, one of the largest contributors to the probability of failure for a device incorporating a flash memory is the flash memory itself. As flash memory components are usually soldered to other components such as a main circuit board, a flash memory failure will often result in the need to replace not only the flash memory, but other components as well.

Single bit errors in flash memory can arise for a number of reasons, such as manufacturing defects or programming disturbances, as is known in the art. More recent advances in the technology used to implement flash memory, such as reductions in feature size and the practice of storing two bits in each cell, have tended to increase the rate of single bit errors in flash memory devices.

It is known to try to identify and compensate for bit errors occurring in flash memory devices, so as to try to avoid any such errors causing a "catastrophic" failure of the device. Such techniques typically use error correcting schemes and codes, but are often required to be implemented using bespoke or dedicated hardware, and/or can lead to undesirable delays in reading and/or writing data from and to the memory.

The Applicants believe therefore that there remains a need for an improved technique for increasing the reliability of memory devices and in particular of flash memory devices.

SUMMARY OF THE INVENTION

According to a first aspect of the present invention, there is provided a method of storing data on a memory device, comprising:

storing the data as one or more segments in the memory device;

determining and storing an error detection code for each segment; and storing in the memory device an error correction segment that is derived from the data segment or segments and that can be used to reconstruct data in a data segment.

According to a second aspect of the present invention, there is provided a method of storing data in a memory device, comprising:

dividing the data to be stored in the memory device into one or more segments;

deriving an error detection code for each data segment;

deriving from the data segment or segments an error correction data segment that can be used to recreate data in a data segment; and writing the data segment or segments, error detection codes, and error correction segment to the memory device.

According to a third aspect of the present invention, there is provided a memory device storing:

one or more separate data segments;

an error detection code for each data segment; and an error correction data segment that is derived from the data segment or segments and that can be used to reconstruct data in a stored data segment.

According to a fourth aspect of the present invention, there is provided an apparatus for storing data in a memory device, comprising:

means for dividing data to be stored in the memory device into one or more segments;

means for deriving an error detection code for each data segment;

means for deriving from the data segment or segments an error correction data segments that can be used to recreate data in a data segment; and means for writing the data segment or segments, error detection codes, and error correction segment to a memory device.

BRIEF DESCRIPTION OF THE DRAWINGS

A number of preferred embodiments of the present invention will now be described by way of example only and with reference to the accompanying drawings, in which.

DETAILED DESCRIPTION OF A PREFERRED EMBODIMENT

In the present invention, data to be stored in the memory device is stored in the memory device in the form of data segments, and for each data segment an error detection code is determined. A further error correction data segment based on the data segments is also derived and stored in the memory device.

The Applicants have found that this form of structure for storing data in a memory device and for deriving and storing the related error correction information can provide a relatively high degree of error protection (such that the reliability of the memory device, and accordingly of the device incorporating it, is increased), even when using relatively simple and more straightforward error detection and correction processes. This facilitates the use of more simple and less complex error correction codes and algorithms, whilst still retaining a sufficiently high degree of error protection (and hence reliability).

The ability to use less complex error correction codes and algorithms means that there is less or no need for bespoke or more complex error correction hardware devices, and facilitates software-implemented error correction. Furthermore, the software code required to implement the error correction can be relatively simple, such that it can be used with, for example, existing memory device hardware without the need for hardware upgrades, even where the existing system may have restricted memory size (and hence, e.g., software capacity). Because the error correction software can be relatively simple and less complex, it is also less susceptible to failure and errors in use.

The present invention also accordingly facilitates the provision of error correction as part of the "loader" program of an, e.g., flash memory device.

As is known in the art, a flash memory will typically store a piece of software code that is usually referred to as a "loader" that can be run by a microprocessor from the flash memory to load the useful data stored on the flash memory to a "faster" memory for use. This is because flash memory devices have relatively high "latency" (i.e. accessing the data in them is a relatively slow process), and so it is usually desirable to transfer the data in them to a lower latency (i.e. more quickly accessible) memory prior to use of that data (e.g. software code. Because the "loader" program transfers data from the flash memory, it is desirable for the "loader" program to be able to carry out error detection and correction processes as it loads the data.

However, because the "loader" program is executed by fetching instructions and data from the flash memory, it needs to be relatively small and simple in nature. It is also usually fixed in nature and cannot be changed in use (i.e. is not "serviceable" in the field), which means that it should have a low probability of software design and construction errors. As the system of the present invention facilitates the use of relatively simple and straightforward error-correction processes and algorithms (which will, accordingly, meet these criteria), it is accordingly suited to implementation in the "loader" programs (code) of memory devices.

The number of data segments that the memory is divided into and the size of each data segment can be selected as desired. Each data segment should be the same size. Where there is insufficient data to fill all the data segments, then a data segment or segments can be padded out with "dummy" data to fill it or them up.

As will be explained further below, in preferred embodiments of the present invention, the error correction segment will be the same size as an individual data segment used to store the "useful data" on the memory device. This means that the smaller the individual data segments (i.e. the more data segments there are) used to store the "useful data", the smaller the data overhead, etc., for the error correction segment. It is generally preferred therefore for there to be a plurality of "useful data" data segments. Ten has been found to be a suitable number.

The error detection code for each data segment can be calculated as desired. The error detection code should provide a value or values that can be used, e.g., at the time of reading the data segment, to check whether the data segment has been read correctly (i.e. whether there are any errors present in the read data), as is known in the art. The code should, accordingly, be generated appropriately from the data in the data segment using a suitable error detection code or checksum generating algorithm.

Any suitable error detection code generating algorithm can be used for generating the error detection code of each data segment. The error detection code (and accordingly any algorithm used to generate it) is preferably one that will ensure that any single bit error in the data segment can be detected. Most preferably the error detection code generating algorithm can also detect errors which affect multiple bits within a given block of data within a data segment.

The error detection code is also preferably such that it can be generated with a single pass over the data in a data segment (as this helps to increase efficiency and simplicity of the code generating process). It is also preferably relatively small in size (as that reduces the storage capacity required to store the error detection codes on the memory device (and elsewhere)).

The error detection code can preferably be calculated, as discussed above, using a relatively simple and noncomplex algorithm, as this, for example, reduces the probability of coding errors when implementing the algorithm. It is also preferred that the error correction code is and can be generated using a coding scheme or algorithm that is relatively simple to implement with a general purpose microprocessor.

The error detection code generating algorithm preferably operates on blocks or words of data in the data segment. Thus the data in the data segment is preferably divided into equal-sized blocks or words, to which the error detection code generating algorithm is then applied. Most preferably, the data segment is divided into data words that are the same size as the word size of the arithmetic logic unit (ALU) of the microprocessor that is executing the error detection code generating algorithm. Thus, for example, for a 32 bit microprocessor, the error detection code is preferably generated by dividing the data segment into 4-byte words. However, other word sizes could be used if desired, and may, for example, be preferred in the case of non-32-bit microprocessors.

In such arrangements, the error detection code generating algorithm could, for example, comprise adding up all the words in the data segment (which would, for example, detect single bit errors in the data segment).

However, in a particularly preferred embodiment, the error detection code of each data segment is in the form of a longitudinal redundancy checksum (LRC), i.e. is derived by XORing (exclusive ORing) all of the words in the data segment together (i.e. by XORing the first word with the second word, then XORing the result with the third word, then XORing the result with the fourth word, and so on). In a particularly preferred such embodiment where the error detection code is being generated by a 32-bit microprocessor, the error detection code of each data segment is in the form of a 4-byte longitudinal redundancy checksum that is calculated by XORing each 4-byte word in the data segment together.

This form of error detection code has been found by the Applicants to provide the various preferred features for the error detection code and its algorithm discussed above. Furthermore, using an XOR operation to generate the error detection code is particularly advantageous, because most if not all general purpose microprocessors are preprogrammed with an XOR instruction (e.g. of the form A XOR B' C, where A B and C are registers (C might be the same register as one of A or B, or could be a different one)) that they can therefore readily carry out. The Applicants have recognized that this efficient XOR facility of general purpose microprocessors can be exploited to provide an efficient, yet relatively straightforward, error detection process for a memory device.

In addition, such error detection code generating algorithms are relatively simple algorithms and therefore relatively simple to code and relatively fast in operation as compared to other error correction coding techniques such as Hamming or Reed-Solomon coding, but can still provide a sufficiently high degree of protection. This means that the error detection coding algorithm can, as discussed above, relatively easily be implemented (e.g. in software) in existing general purpose commodity hardware, and/or in the "loader" code of a flash memory device, etc., even where code size restrictions may apply, and without requiring, e.g., special circuitry or hardware upgrades.

It is believed that using such an error detection code generating algorithm to error protect data stored in a memory device may be new and advantageous in its own right. Thus, according to a fifth aspect of the present invention, there is provided a method of storing data in a memory device, comprising:

generating a longitudinal redundancy checksum value from data to be stored in the memory device; and storing the longitudinal redundancy checksum value together with the data from which it is derived in the memory device to act as an error detection code for the data stored in the memory device.

According to a sixth aspect of the present invention, there is provided a memory device storing data together with a longitudinal redundancy checksum value derived from the data to act as an error detection code for the data.

According to a seventh aspect of the present invention, there is provided an apparatus for storing data in a memory device, comprising:

means for deriving a longitudinal redundancy checksum value to act as an error detection code from data to be stored in the memory device; and means for storing the data together with the longitudinal redundancy checksum value in the memory device.

As will be appreciated by those skilled in the art, the above aspects of the present invention can also include any one or more or all of the preferred features of the invention described herein.

The error detection codes of each data segment on the memory device can be stored in the memory device in any suitable manner. Thus they could, for example, each be stored with their respective data segments, or all the error detection codes could be stored together, separate from their respective data segments.

As discussed above, as well as including an error detection code for and derived from each "useful data" data segment in the memory device, the data storage structure of the present invention also includes a data segment that can be used as an error correction segment, i.e. to correct or recreate data stored in the "useful data" data segments stored in the memory when, for example, an error in one of those data segments is detected.

This error correction segment should, accordingly, be generated in some way from the data in the data segments stored or to be stored in the memory device, e.g., using a suitable algorithm on that data to generate the data for the error correction segment. It should be able to be used to correct any single bit error in a known data segment (which can be identified using the error detection code, as discussed above), and most preferably can be used to correct multiple bit errors within a data segment. It can otherwise be generated as desired.

The error correction segment generating algorithm (and hence, accordingly, the error correction process using it) can preferably again calculate the correct data with a single pass over the data stored in the memory, and/or, preferably is a relatively simple algorithm, as such arrangements have advantages in this context as discussed above in relation to the error detection code generation process. It is again preferably an algorithm and process that is (relatively) simple to implement with a general purpose microprocessor.

In a particularly preferred embodiment, the error correction segment is generated using a logical XOR operation on the data in the other data segments, since, as discussed above, using XOR operations for such purposes is advantageous in the context of the present invention. Most preferably the error correction segment contains the logical XOR of the data in all of the other data segments (i.e. is generated by the bitwise XOR of the data in the first and second data segments, then the bitwise XOR of the result with the data in the third data segment, and so on).

Such an error correction segment would, for example, allow the data in a segment in which an error is found to have occurred to be rebuilt by XORing all the remaining data segments together with the error correction segment, and has been found by the Applicants to provide the desired preferred features for this error correction segment discussed above. Thus, it will, for example, allow the correction of multiple errors in a data segment, and yet remains a relatively simple algorithm that is therefore relatively simple to code and relatively fast in operation, such that it can, as discussed above, relatively easily be implemented (e.g. in software) in existing general purpose commodity hardware, and/or in the "loader" code of a flash memory device, etc.

It is believed that using such an error correction segment generating algorithm to error protect data stored in a memory device may be new and advantageous in its own right. Thus, according to an eighth aspect of the present invention, there is provided a method of storing data in a memory device, comprising storing the data in the memory device in a plurality of segments;

generating an error correction data segment from the data segments to be stored in the memory device by XORing data in those data segments together; and storing the error correction data segment together with the data segments from which it is derived in the memory device.

According to a ninth aspect of the present invention, there is provided a memory device storing a plurality of data segments together with an error correction data segment derived from the stored data segments by XORing data in those data segments together.

According to a tenth aspect of the present invention, there is provided an apparatus for storing data in a memory device, comprising:

means for storing the data in the memory device in a plurality of segments;

means for deriving an error correction data segment from the data segments to be stored in the memory device by XORing data in those data segments together; and means for storing the error correction data segment in the memory device.

Again, as will be appreciated by those skilled in the art, the above aspects of the present invention can also include any one or more or all of the preferred features of the invention described herein.

In a preferred embodiment, an error detection code is derived and stored for the error correction segment, as well as for the other "useful data" data segments. This would allow the detection of errors when reading out the error correction segment from the memory. Where this is done, the error detection code should preferably be generated in the same manner as the error detection codes for the other data segments of the memory device.

The way that the data is read from a memory device in accordance with the present invention will naturally depend on how exactly the data has been stored in the memory device. The data can generally be read from the memory device in any suitable manner.

In a particularly preferred embodiment, the data is read out on a segment-by-segment basis, and the error detection code of each read out data segment then used to check that the data has been validly read out. This can be and preferably is done, as is known in the art, by applying the error detection code generating algorithm to the data read out for a data segment and then comparing the so-generated error detection code with the error detection code value stored for that data segment in the memory device. If the two codes match, then it assumed that the data has been validly read out, but if they do not, then it is assumed that an error has occurred.

Preferably this is done for each data segment read out, and if all the data segments are found to have been validly read out (such that, therefore, no error correction is needed), the data can be loaded from the memory device for use.

If a data segment has an invalid error correction code (i.e. its generated error correction code does not match the stored error correction code), thereby indicating an error in the data read out, that data segment is then preferably rebuilt (i.e. the data in it generated afresh) using the error correction segment stored in the memory device.

Again, this operation can be carried out in any suitable manner and its exact implementation will depend, as will be appreciated by those skilled in the art, on how the error correction segment is derived from the data segments in the first place. As discussed above, where the error correction segment is generated by using the preferred technique of XORing the data in all the data segments, an erroneous data segment can be rebuilt by XORing all the remaining data segments together with the error correction segment.

If more than one data segment is found to contain errors, or the error correction segment is found to contain errors (where it is provided with an error detection code) then it is preferably assumed that the memory device has failed catastrophically and should be replaced, and thus the data correction and loading process halted.

It is believed that these techniques for reading and checking data stored in a memory device in accordance with the present invention may be new and advantageous in their own right. Thus, according to an eleventh aspect of the present invention, there is provided a method of reading data from a memory device in which useful data is stored in the form of one or more segments, together with an error detection code derived for each segment, and an error correction segment that can be used to generate data stored in a data segment, the method comprising:

reading one or more useful data segments of the memory device and their corresponding stored error detection codes;

generating from each read data segment an error detection code and comparing that error detection code with the read stored error detection code for that data segment;

if the generated and read error detection codes match, loading the data in the data segment for use; and if the generated and read error detection codes do not match, using the error correction segment and one or more of the read useful data segments to generate the data in the data segment for which the generated and read error detection codes do not match, and loading that generated data for use.

According to a twelfth aspect of the present invention, there is provided an apparatus for reading data from a memory device in which useful data is stored in the form of one or more segments, together with an error detection code derived for each segment, and an error correction segment that can be used to generate data stored in a data segment, the apparatus comprising:

means for reading one or more useful data segments of the memory device and their corresponding stored error detection codes;

means for generating from each read data segment an error detection code and for comparing that error detection code with the read stored error detection code for that data segment;

means for, if the generated and read error detection codes match, loading the data in the data segment for use; and means for, if the generated and read error detection codes do not match, using the error correction segment and one or more of the read useful data segments to generate the data in the data segment for which the generated and read error detection codes do not match, and for loading that generated data for use.

As will be appreciated from the above, these aspects of the invention can include any one or more or all of the preferred features of the present invention discussed above. Thus, for example, the stored and generated error detection codes are preferably derived by applying the same algorithm to the data in the corresponding data segment. Similarly, the error correction segment is preferably derived from all the (useful) data segments on the memory device. Furthermore, it is preferred that it is determined how many data segments are found to contain errors, and if only one is found to contain errors, the data in that data segment regenerated, but if more than one data segment is found to contain errors, the data is not regenerated and loaded for use, but rather the process is aborted.

As discussed above, the present invention is particularly applicable to flash memory devices (normally flash EPROM (Electronically Programmable Read-Only Memory). However, it can also, as will be appreciated by those skilled in the art, be used with other forms of electronic, solid state and integrated circuit memory devices, particularly those that are used to store "persistent" data, (and particularly such devices that are susceptible to errors), such as ROM (and particularly other forms of erasable programmable nonvolatile memory devices, such as EPROM (erasable programmable Read-Only memory) and EEPROM (electronically erasable programmable Read-Only memory)) and battery-backed SRAM (static random access memory).

The methods in accordance with the present invention may be implemented at least partially using software e.g. computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a memory device storing such computer software code portions for performing the methods hereinabove described when the software code portions are run on data processing means, for example as part of the "loader" code for the memory device.

The invention additionally extends to a computer software carrier comprising such software which when used to operate a microprocessor system comprising data processing means causes in conjunction with said data processing means said system to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

The present invention may accordingly suitably be embodied as a computer program product for use with a computer system. Such an implementation may comprise a series of computer readable instructions either fixed on a tangible medium, such as a computer readable medium, for example, diskette, CDROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Figure 1:
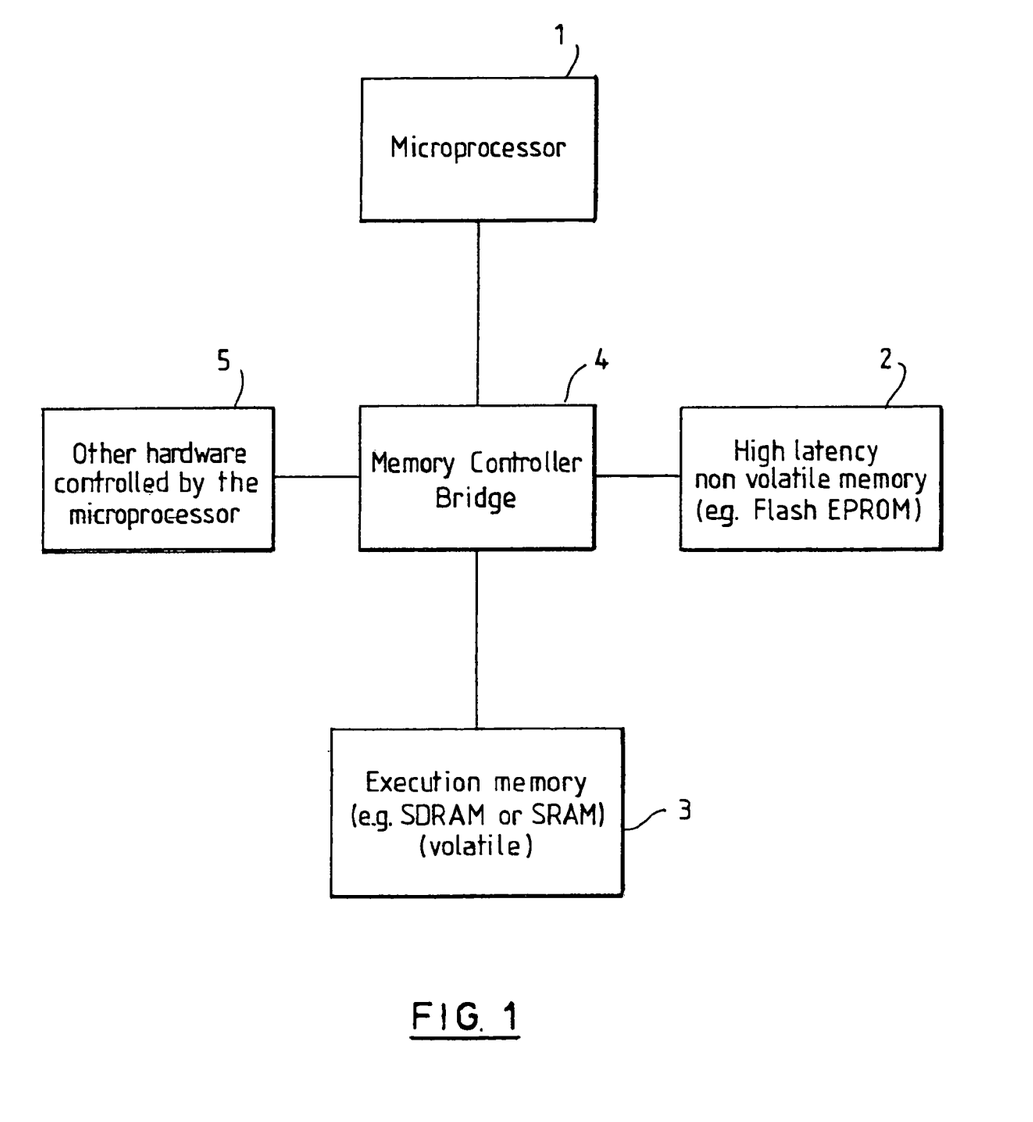
FIG. 1 shows schematically an implementation of a flash memory device in accordance with the present invention in a microprocessor-based system.

FIG. 1 shows schematically an implementation of a flash memory device in a microprocessor-based system. The system includes a general purpose microprocessor 1, a high latency nonvolatile memory 2 in the form of a flash EPROM (Erasable Programmable Read Only Memory), an execution memory 3 (which typically will be volatile, e.g. in the form of a SDRAM (Synchronous Dynamic Random Access Memory) or SRAM (Static Random Access Memory), a memory controller bridge 4, and other hardware 5 that may be controlled by the microprocessor 1. The memory controller bridge 4 helps to control communications between the microprocessor 1 and the flash memory 2, execution memory 3, and other hardware 5.

In this system, the flash memory 2 will store, as is known in the art, "useful data" that is required by the microprocessor 1. Such data could comprise, for example, applications programs to be executed on the microprocessor 1, and/or data that is required by the microprocessor 1 for its operations. This data is stored in the flash memory 2 because it is a nonvolatile memory.

However, because the flash memory 2 has a high latency (i.e. the process of accessing data in the flash memory 2 is relatively slow), an additional, faster, "execution" memory 3 is provided into which data, software code, etc., stored on the flash memory 2 can be (and is) loaded at startup of the system so as to allow the microprocessor 1 to access that data, software code, etc., from the execution memory 3 more quickly in use. As is known in the art, the data from the flash memory 2 is loaded into the execution memory 3 by means of the microprocessor 1 running on startup a piece of code, commonly referred to as a "loader", out of the flash memory 2 that has the task of moving the main programs, data, etc., from the flash memory 2 to the execution memory 3.

Figure 2:
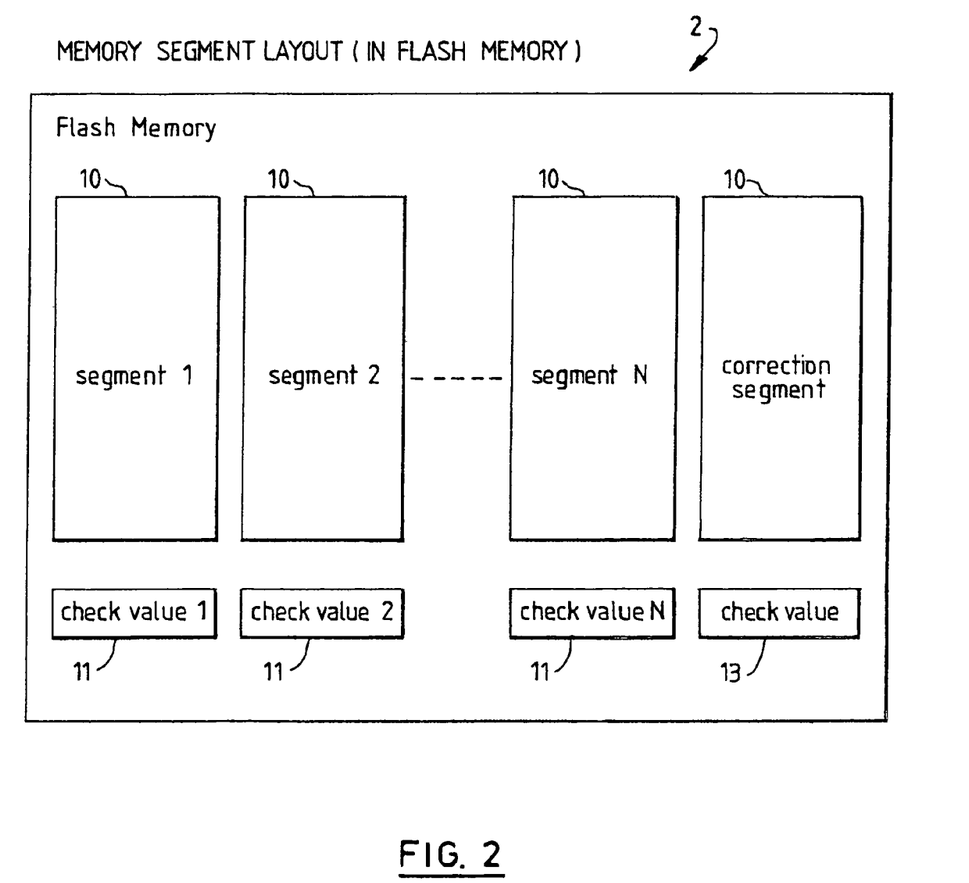
FIG. 2 shows schematically the flash memory device of FIG. 1.

FIG. 2 shows schematically the layout of the data stored on the flash memory 2 of the system shown in FIG. 1. This data structure is in accordance with the present invention.

As can be seen from FIG. 2, the "useful" data in the flash memory device 2 is divided up into N equal segments 10 that are stored on the memory 2. This can be done in any suitable manner known in the art. For example, where the data is to be divided into N equalsized segments, this could be done by, starting at the beginning of the address space, allocating the data to the segments as follows: bytes of addresses 0 to (data size/N) 1 to the first segment, bytes at addresses (data size/N) to (2×data size/N) 1 to the second segment, and so on. If there is insufficient data to fill all the segments, "dummy" data can be generated and used to fill out the incomplete data segment or segments.

For each of the data segments 10, an error detection code 11 in the form of a 4-byte longitudinal redundancy checksum (LRC) value is determined. The LRC is calculated over 4-byte words in the data segment, by, as is known in the art, first initializing a longitudinal redundancy checksum accumulator with a seed value (which could be zero), and then, starting at the beginning of the data, changing the accumulator value to the result of the current accumulator value XORed with the first 4-byte data word in the data segment, then moving to the next 4-byte word of data in the data segment and setting the accumulator value to the current accumulator value XORed with that data word, and so on, until the end of the data is reached (at which point the value in the accumulator is the longitudinal redundancy checksum). Using this form of algorithm for deriving the error detection code of each data segment 11 ensures that any single bit error in a given data segment 10 can be detected.

The error detection codes 11 for the data segments 10 are also stored in the memory device 2. As shown in FIG. 2, they may be stored associated with their respective data segment. Alternatively they may, e.g., be stored all together and separate from the data segments 10.

As well as the "useful" data segments 10, the flash memory 2 also stores a further data segment 12 which is to be used as an error correction segment. This correction segment 12 can be used, as will be explained further below, to regenerate data in the other data segments 10, and in the present embodiment contains the logical XOR of the data in all of the other segments 10.

An error detection code 13, again in the form of 4-byte longitudinal redundancy checksum value, is also calculated for the error correction segment 12 and stored in the flash memory 2. Again, that error detection code check value 13 could be stored, as shown in FIG. 2, with the error correction segment 12, or could be stored elsewhere on the flash memory 2.

Figure 3:
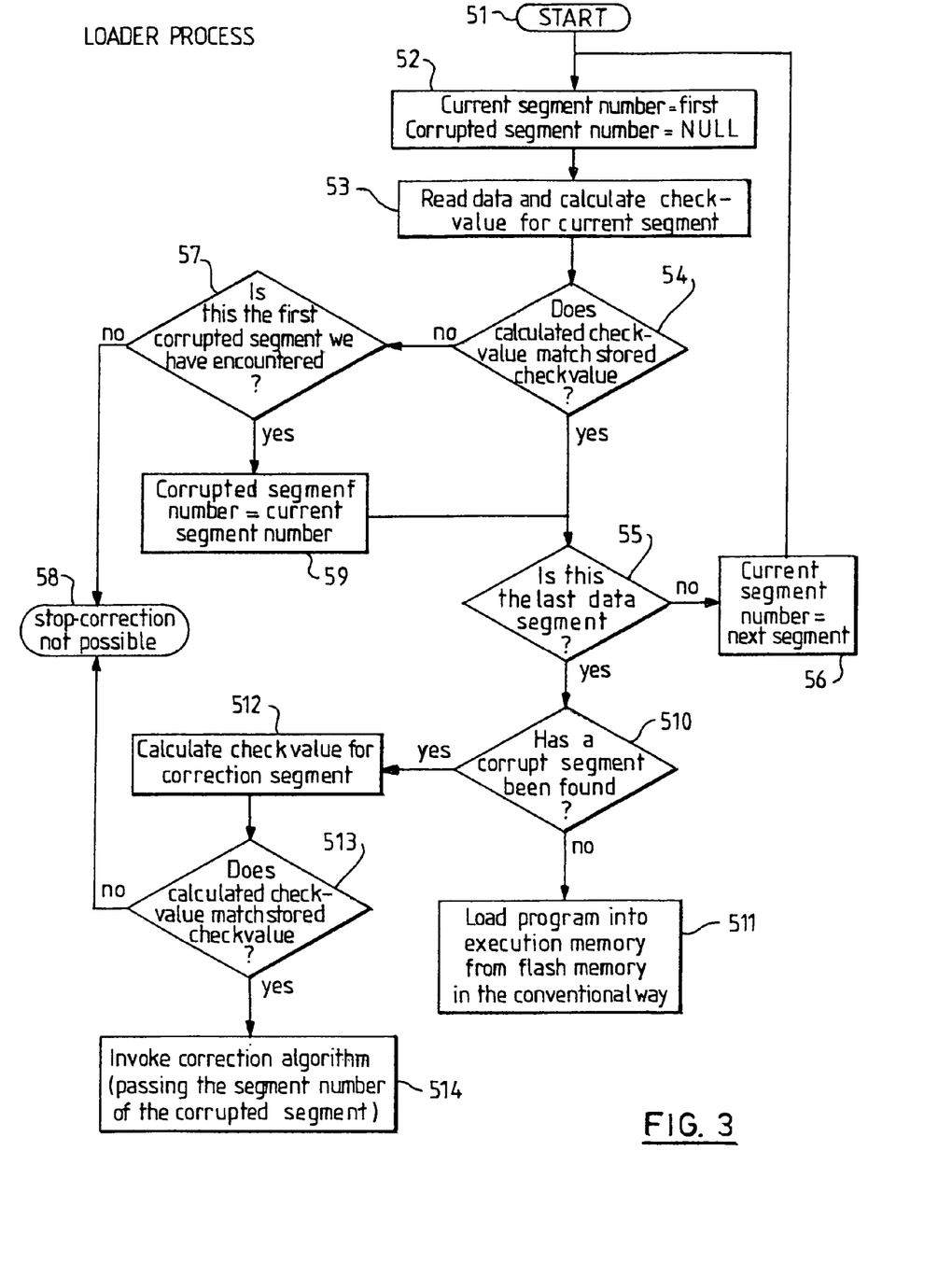
FIG. 3 is a flowchart showing the steps for loading data from the memory device of FIG. 2.

FIG. 3 is a flowchart showing the steps for loading the data from the flash memory 2 to the execution memory 3. As discussed above, this process would be carried out by the "loader" code stored on the flash memory 2 (not shown in FIG. 2).

The loading process is started at step S1 and then at step S2 the current segment number register (which tracks which data segment in the flash memory 2 is currently being analyzed) is set to the "first data segment" and the corrupted segment number register (which records the identity (number) of a data segment 10 found to contain errors) is set to "null" (since at this time no corrupted data segments 10 will have been detected)

The error detection check value is then calculated for the current data segment from the data stored for that data segment on the flash memory 2 in step S3. This is done by the microprocessor 1 fetching the data from the flash memory 2 one word at a time as it accumulates the checksum. The calculated check value is then compared to the stored error detection code check value for that data segment (which is again fetched from the flash memory 2 by the microprocessor 1 for this purpose) in step S4.

If it is found at step S4 that the calculated check value does match the stored checked value, then it is assumed that there are no errors in the data stored in the current data segment and so the process proceeds to step S5 where it is determined whether the current data segment (i.e. the data segment just checked) was the last data segment in the memory 2. If not, the process returns via step S6 in which the current data segment number is set to the next data segment stored in the memory, to repeat the steps S2, S3 and S4, to check the data stored in the subsequent data segments, and so on.

If, on the other hand, it is found in step S4 that the calculated check value for the current data segment does not match the stored check value for that data segment, then it is assumed that that data segment is corrupted. The process then proceeds to step S7 where it is determined whether the current corrupt data segment is the first corrupted data segment that has been encountered. If it is not (i.e. more than one data segment has been found to be corrupted (i.e. to contain errors)), then the process proceeds to step 58 and is halted. (This is because, as will be explained further below, the error correction process of the present embodiment does not permit the correction of errors where more than one data segment contains errors.)

If, on the other hand, the current data segment is the first corrupted data segment to have been encountered, the process proceeds to step S9 where the corrupted segment number is set to the current segment number (i.e. such that a record is kept of which data segment has been found to be corrupted), and then returns to step S5 and continues until such time as all the data segments have been checked.

If at step S5 it is found that the last data segment has been checked, the process then proceeds to step S10 in which it is determined whether a corrupted data segment has been found. If no corrupt data segments have been found, then the data, e.g. program, on the flash memory 2 is loaded into the execution memory 3 from the flash memory 2 in the conventional way (step S11).

On the other hand, if a corrupt data segment has been found, the process proceeds to steps S12 and S13, where the correction segment 12 is read out and checked by calculating a check value for it from the stored correction segment (S12), and then comparing that calculated check value with the stored check value 13 for the error correction segment 12 (step S13).

If it is found that the calculated check value for the error correction segment 12 does not match the stored check value for that error correction segment, then again the process proceeds to step S8 and is halted, since that is again a situation where, as will be explained further below, the error correction processes will not be able to operate properly.

Figure 4:
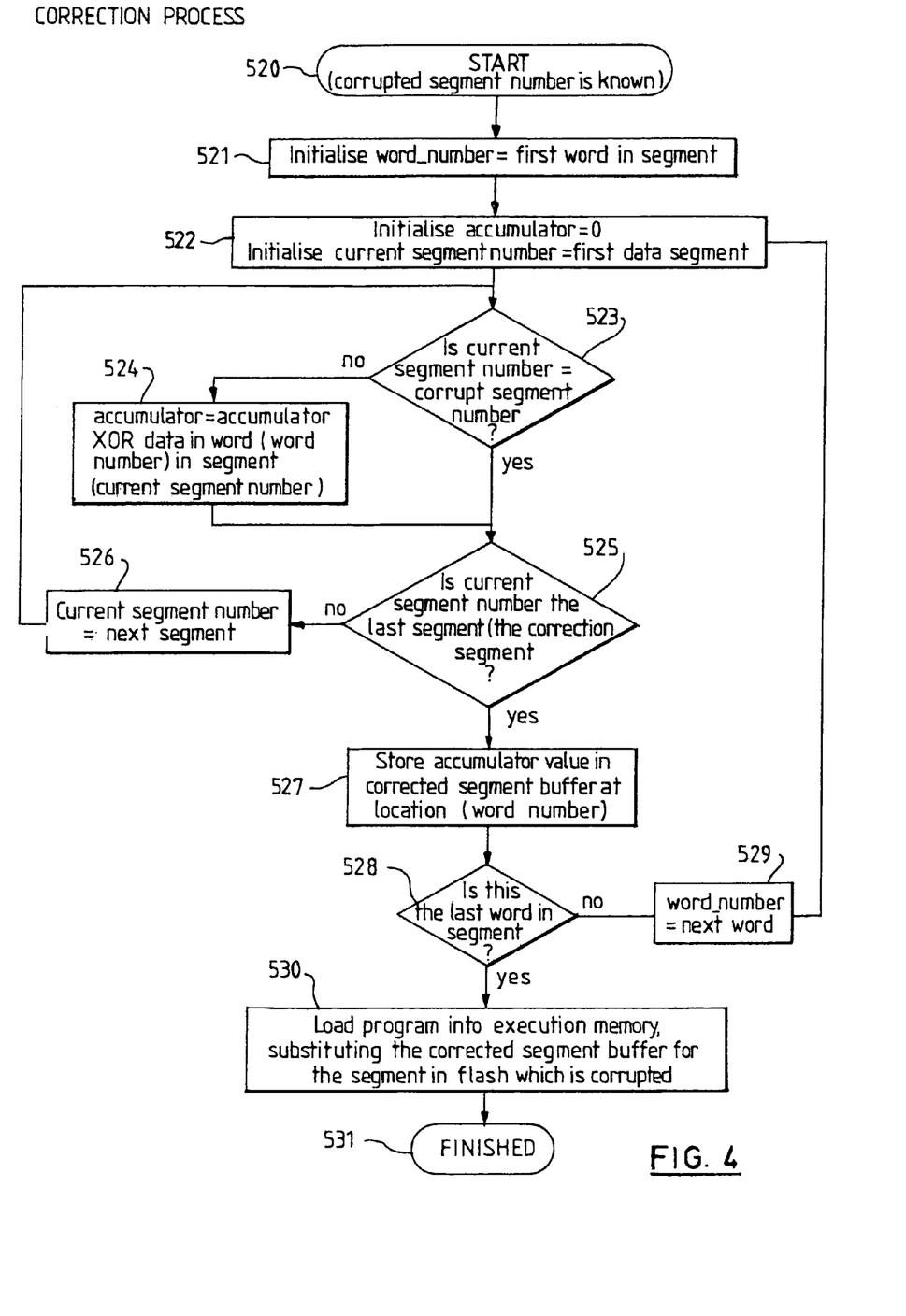
FIG. 4 is a flowchart showing the steps for correcting data read from the memory device of FIG. 2.

On the other hand, if it is found in step S13 that the error correction segment 12 does not contain any errors, then the (single) corrupt data segment can be corrected using the error correction segment 12, and so the process proceeds to step S14 where the error correction algorithm (which will be explained below with reference to FIG. 4 is invoked. The segment number of the corrupted data segment (which is recorded, as discussed above, in step S9), is accordingly passed to the error correction algorithm so that a corrected version of that data segment can be generated and then loaded into the execution memory 3.

FIG. 4 shows the steps carried out by the error correction process. This process basically builds a corrected copy of the data segment which was found to be in error in a memory buffer (referred to as a corrected segment buffer in FIG. 4) in the execution memory 3, and then uses that corrected copy as a substitute for the corruptly stored data segment on the flash memory 2.

The error correction process basically operates by XORing all of the error free data segments (i.e. excluding the data segment found to be corrupted) together with the error correction segment stored on the flash memory 2. This builds a corrected copy of the data segment which was found to be corrupted. The operation is carried out over data words in the data segments (in practice the same data words that are used, as discussed above, to derive the error detection codes for the data segments), as will be explained further below.

The error correction process starts at step S20 with knowledge of the identity of the data segment found to be corrupted (i.e. the corrupted segment number identified in the data loading process of FIG. 3), which, as discussed above, is provided to the correction process.

The next step S21 initializes the word number register (which keeps a track of the data word in the data segment currently being processed) to be equal to the first word in the data segment.

Then in step S22, a corrected data word accumulator is initialized and set to value zero. (This accumulator will, as described below, be used to calculate and store the corrected copy of the current data word prior to it being transferred to the buffer memory where the complete copy of the corrected data segment will ultimately be stored.) At step S22, a current segment number register (which tracks the data segment currently being processed) is also initialized and set to equal the first data segment.

The process then proceeds to step S23 where it is determined whether the data segment currently being processed is the data segment that was found to be corrupted. If not, the process proceeds to step S24 where the corrected data word accumulator is set to equal the result of XORing the current corrected data word accumulator value with the data in the data word currently being handled (identified by the word number register and the current data segment number). The process then proceeds to step S25.

If it is found at step S23 that the data segment currently being processed is the corrupted data segment, then the process proceeds directly to step S25 and bypasses step S24. This avoids the corrupted data segment affecting the corrected data word accumulator.

At step S25 it is determined whether the segment currently being processed is the last data segment (it should be noted here that in this process the correction segment is simply treated as a data segment with a segment number one greater than the last "useful" data segment, i.e. such that the correction segment is included in the correction process and will in practice be the last segment that is processed). If the current data segment is not the last data segment (i.e. the correction segment), then the process proceeds to step S26 where the current data segment number register is set to the next data segment and the process of processing the corresponding data word in that data segment through steps S23 and S24 is carried out, and so on.

The effect of this is that for a given data word position in the data segments, all of the data words in that position in all of the data segments save for the corrupted data segment are XORed together one by one and the result stored in the corrected word accumulator.

Once it is determined at step S25 that the last data segment has been processed (i.e. indicating that the corrected data word accumulator now stores the result of XORing all data words in the noncorrupted data segments and the error correction segment together, i.e. stores the correct value of that data word as it should appear in the corrupted data segment), then the process proceeds to step S27 where the corrected data word accumulator value is stored in the appropriate word location in the corrected segment buffer in the execution memory 3.

The process then proceeds to step S28 where it is determined whether the corrected data word that has just been stored is the last data word for the corrupted data segment. If not, the process proceeds to step S29 where the data word being processed (i.e. the word number register) is set to the next data word in the data segment. The whole process is then repeated so as to build a correct copy of that data word, and so on.

It can be seen that in this way, a copy of the data segment found to be corrupted is built up and stored in the memory buffer data word by data word.

Once it is determined at step S28 that the last data word position in the data segments has been processed (i.e. a complete corrected copy of the data segment found to be corrupted is now stored in the memory buffer), the process proceeds to step S30 at which point the data from the flash memory is loaded into the execution memory 3, but substituting the corrected data segment in the corrected data segment buffer for the data segment stored in the flash memory 2 that was found to be corrupted. The process then stops at step S31.

As will be appreciated from the above, this error correction process will not work to correct the data if more than one data segment contains errors, i.e. to correct a "double-error" situation. However, as double-errors can arise by a number of means and the preferred algorithms of the present invention do not otherwise seek to identify and correct double-errors, the Applicants believe that this is not overly detrimental to the system of the present invention when set against the advantages otherwise afforded by the preferred algorithms of the present invention. However, a more complex error correction segment that allows the correction of double-errors could be used, if desired, albeit at the cost of additional complexity to the system.

It will also be appreciated in this regard, that the more "useful data" data segments there are, the more likely it is that there could be errors in more than one data segment. This is therefore a factor that it may be desirable to consider when selecting the number of "useful data" data segments to use, such that, for example, the number of data segments used is based on, e.g., the storage overhead for the error detection segment (which, as discussed above, will decrease, the more data segments there are) balanced against the risk that a cluster of errors in the flash memory will affect more than one data segment (which risk will increase, the more data segments there are).

As discussed above, the various algorithms used to derive the error detection codes and the error correction segment can be varied if desired. Similarly, although the present invention is particularly applicable to flash memory devices, it is also applicable to other memory devices, particularly nonvolatile devices that store persistent data.

It can be seen from the above that in its preferred embodiments at least, the present invention provides a technique for improving the reliability of, inter alia, flash memory technology, that is convenient for implementation using only (relatively simple) software in the "loader" code of the memory. This is achieved in the preferred embodiments of the present invention at least by using longitudinal redundancy checksums and an XOR error correction code scheme to detect and correct errors in data stored in the memory.

What is claimed is:

1. A method of storing data in a memory device, said method comprising:
   dividing data to be stored in a memory device into one or more data segments;
   storing said one or more data segments in said memory device;
   for a particular data segment among said one or more data segments, creating an error detection code;
   storing said error detection code in said memory device;
   for said particular data segment, determining an error correction segment that is a logical combination of said particular data segment with a second data segment, wherein said error correction can be used to reconstruct said particular data segment; and
   storing said error correction segment in said memory device.

2. The method of claim 1, wherein:
   said dividing step further comprises dividing the data in a particular data segment into words; and
   said creating step further comprises creating an error detection code for said particular segment using said data words.

3. The method of claim 1, wherein said creating step further comprises creating said error detection code for said particular data segment in the form of a longitudinal redundancy checksum.

4. The method of claim 1, wherein said creating step further comprises creating said error detection code for said particular data segment in the form of a 4-byte longitudinal redundancy checksum.

5. The method of claim 1, wherein said determining step further comprises determining the logical XOR of said particular segment with a second data segment.

6. The method of claim 1, further comprising determining a second error detection code for said error correction segment, and storing said second error detection code in said memory device.

7. The method of claim 1, wherein said dividing step further comprises dividing said particular data segment into equal-sized words.

8. A system for storing data in a memory device, said system comprising:
   means for dividing data to be stored in a memory device into one or more data segments;
   means for storing said one or more data segments in said memory device;

means for, for a particular data segment among said one or more data segments, creating an error detection code;

means for storing said error detection code in said memory device;

means for, for said particular data segment, determining an error correction segment that is a logical combination of said particular data segment with a second data segment, wherein said error correction can be used to reconstruct said particular data segment; and means for storing said error correction segment in said memory device.

9. The system of claim 8, wherein:

said dividing means further comprises means for dividing the data in a particular data segment into words; and said creating means further comprises means for creating an error detection code for said particular segment using said data words.

10. The system of claim 8, wherein said creating means further comprises means for creating said error detection code for said particular data segment in the form of a longitudinal redundancy checksum.

11. The system of claim 8, wherein said creating means further comprises means for creating said error detection code for said particular data segment in the form of a 4-byte longitudinal redundancy checksum.

12. The system of claim 8, wherein said determining means further comprises means for determining the logical XOR of said particular segment with a second data segment.

13. The system of claim 8, wherein said determining means further comprises means for determining a second error detection code for said error correction segment, and storing said second error detection code in said memory device.

14. The system of claim 8, wherein said dividing means further comprises means for dividing said particular data segment into equal-sized words.

15. A computer program product in a computer-readable medium for storing data in a memory device, said computer product comprising:

a computer-readable medium;

instructions on the computer-readable medium for dividing data to be stored in a memory device into one or more data segments;

instructions on the computer-readable medium for storing said one or more data segments in said memory device;

instructions on the computer-readable medium for, for said particular data segment among said one or more data segments, creating an error detection code;

instructions on the computer-readable medium for storing said error detection code in said memory device;

instructions on the computer-readable medium for, for said particular data segment, determining an error correction segment that is a logical combination of said particular data segment with a second data segment, wherein said error correction can be used to reconstruct said particular data segment; and instructions on the computer-readable medium for storing said error correction segment in said memory device.

16. The computer program product of claim 15, wherein:

said dividing instructions further comprise instructions on the computer-readable medium for dividing the data in a particular data segment into words; and said creating instructions further comprise instructions on the computer-readable medium for creating an error detection code for said particular segment using said data words.

17. The computer program product of claim 15, wherein said creating instructions further comprises creating said error detection code for said particular data segment in the form of a longitudinal redundancy checksum.

18. The computer program product of claim 15, wherein said creating instructions further comprises creating said error detection code for said particular data segment in the form of a 4-byte longitudinal redundancy checksum.

19. The computer program product of claim 15, wherein said determining instructions further comprises determining the logical XOR of said particular segment with a second data segment.

20. The computer program product of claim 15, wherein said determining instructions further comprises determining a second error detection code for said error correction segment, and storing said second error detection code in said memory device.

21. The computer program product of claim 15, wherein said dividing instructions further comprises dividing said particular data segment into equal-sized words.

* * * * *